United States Patent
Hsieh et al.

(10) Patent No.: US 7,151,584 B2
(45) Date of Patent: Dec. 19, 2006

(54) THIN FILM TRANSISTOR LIQUID CRYSTAL DISPLAY DEVICE FOR REDUCING COLOR SHIFT

(75) Inventors: Tsau-Hua Hsieh, Miao-Li (TW); Jia-Pang Pang, Miao-Li (TW)

(73) Assignee: Innolux Display Corp., Miao-Li (TW)

( * ) Notice: Subject to any disclaimer, the term of this patent is extended or adjusted under 35 U.S.C. 154(b) by 52 days.

(21) Appl. No.: 10/836,563

(22) Filed: Apr. 30, 2004

(65) Prior Publication Data

US 2004/0218130 A1   Nov. 4, 2004

(30) Foreign Application Priority Data

Apr. 30, 2003   (TW) .............................. 92110225 A (51) Int. Cl.
*G02F 1/343* (2006.01)
(52) U.S. Cl. ........................... 349/141; 349/143
(58) Field of Classification Search ............... 349/141, 349/143

See application file for complete search history.

(56) References Cited

U.S. PATENT DOCUMENTS

| | | | | |
|---|---|---|---|---|
| 5,598,285 A | * | 1/1997 | Kondo et al. | 349/39 |
| 5,926,244 A | * | 7/1999 | Takeda et al. | 349/139 |
| 6,005,650 A | * | 12/1999 | Kim et al. | 349/130 |
| 6,088,078 A | * | 7/2000 | Kim et al. | 349/141 |
| 6,128,061 A | * | 10/2000 | Lee et al. | 349/141 |
| 6,791,658 B1 | * | 9/2004 | Maruyama et al. | 349/183 |

* cited by examiner

*Primary Examiner*—Toan Ton
(74) *Attorney, Agent, or Firm*—Wei Te Chung (57) ABSTRACT

An LCD device (2) includes a pair of substrates (21, 22), a liquid crystal layer (27) contained between the pair of substrates, and a plurality of pixel and common electrodes (25, 26) formed on the pair of substrates, respectively. In which, each pixel electrode and common electrode defining at least a first portion (251, 261) and a second portion (252, 262), respectively. The first portions of the pixel and common electrodes are alternately arranged parallel to a first direction, and the second portions of the pixel and common electrodes are arranged parallel to a second direction essential perpendicular to the first direction. Liquid crystal molecules in the LCD device are twisted in two different directions so as to reduce the color shift.

1 Claim, 8 Drawing Sheets

THIN FILM TRANSISTOR LIQUID CRYSTAL DISPLAY DEVICE FOR REDUCING COLOR SHIFT

BACKGROUND OF THE INVENTION

1. Field of the Invention

The present invention relates to a liquid crystal display (LCD) device, and more particularly to a thin film transistor (TFT) LCD device with a wide viewing angle.

2. Description of Prior Art

In a conventional liquid crystal display, a pair of facing transparent electrodes is respectively formed on each of two substrates, and is used for driving a liquid crystal layer therebetween. In such a device, a displaying means known as a TN (twisted nematic) display is adopted. That is, the liquid crystal display operates by being supplied with an electric field having a direction orthogonal to inner surfaces of the substrates.

However, the TN mode LCD has a narrow viewing angle, which means that the quality of the display greatly depends on the direction of viewing. In order to obtain a wide viewing angle, the IPS type LCD has been developed.

A detailed explanation about operation modes of a typical IPS-LCD device 1 is provided hereinbelow, with reference to FIGS. 7 to 9.

Figure 7:
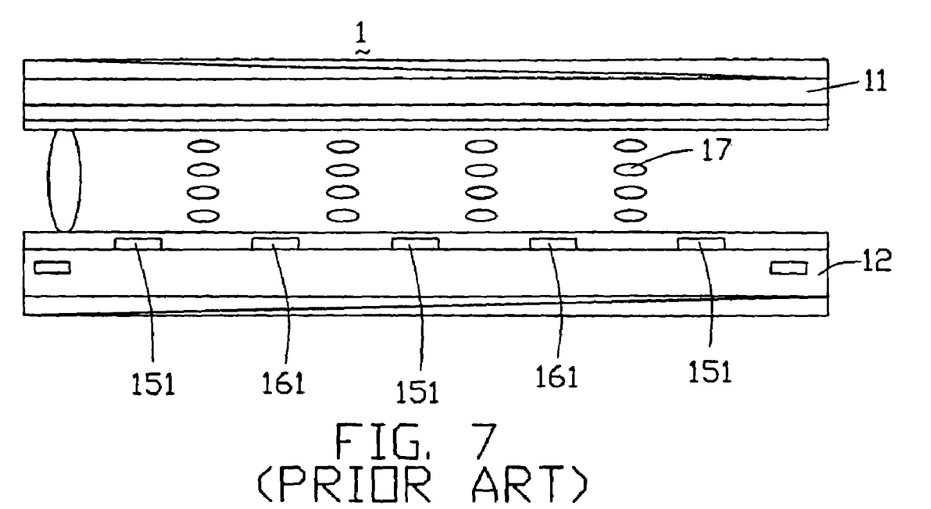
FIG. 7 is a schematic, side cross-sectional view of a conventional LCD device, showing the LCD device in a passive state.
Figure 8:
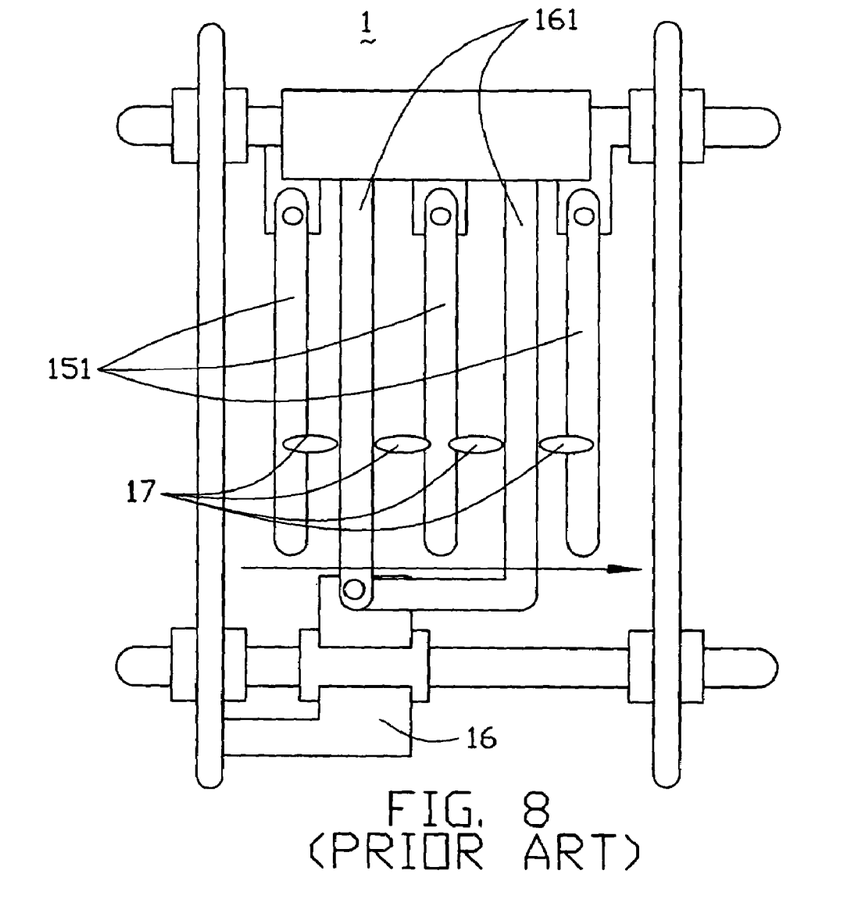
FIG. 8 is a top plan view of a configuration of electrodes of the LCD device of FIG. 7.

As shown in FIGS. 7–8, upper and lower substrates 11 and 12 are spaced apart from each other, and a liquid crystal layer 17 is provided thererbetween. The substrates 11 and 12 are called a color filter substrate and a TFT substrate, respectively. A multiplicity of pixel and common electrodes 161 and 151 is disposed on the lower substrate 12. The pixel and common electrodes 161 and 151 are parallel to but spaced apart from each other.

When no electric field is provided between the pixel and common electrodes 161 and 151, long axes of liquid crystal molecules in the liquid crystal layer 17 maintain a predetermined angle relative to the pixel and common electrodes 161 and 151. Typically, the angle is 45 degrees, as represented in FIG. 7.

Figure 9:
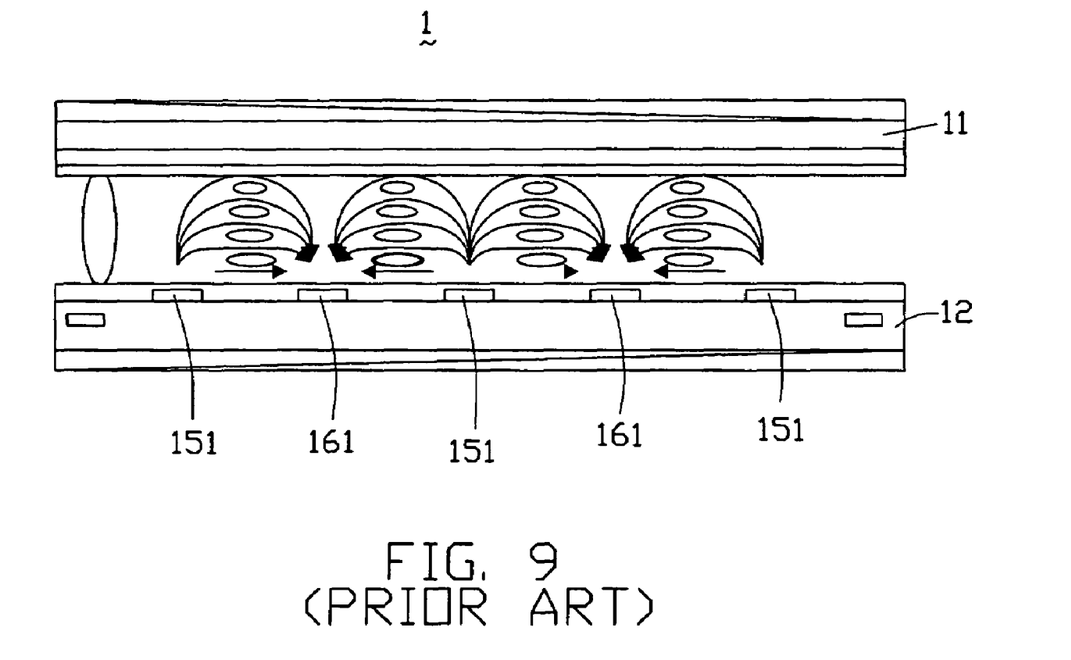
FIG. 9 is similar to FIG. 7, but showing the LCD device when a voltage is applied thereto.

As shown in FIG. 9, when a voltage is applied between the pixel and common electrodes 161 and 151, a horizontal in-plane electric field that is parallel to a surface of the lower substrate 12 is established between the pixel and common electrodes 161 and 151. The liquid crystal molecules are twisted so as to align according to the electric field. That is, the long axes of the liquid crystal molecules are oriented perpendicular to the pixel and common electrodes 161 and 151.

The IPS-LCD device 1 is a conventional single-domain IPS-LCD device. This type of IPS-LCD device has some inherent problems. First, since the pixel and common electrodes 161 and 151 are all oriented in a single direction, the liquid crystal molecules are rotated only in a single direction. This means that an associated display screen exhibits color shift when the display screen is obliquely viewed while displaying white. Second, of the numerous pixel and common electrodes 161 and 151 are both disposed on the surface of the lower substrate 12. A width of so-called teeth and bone portions of the pixel and common electrodes 161 and 151 cannot be less than about 3 to 4 microns. Thus the aperture ratio of each pixel area is reduced.

It is desirable to provide an improved liquid crystal display device which overcomes the above problems.

SUMMARY OF THE INVENTION

It is an object of the present invention to provide a liquid crystal display device having two domains so as to reduce color shift.

Another object of the present invention is to provide a liquid crystal display device having a high aperture ratio.

In order to achieve the objects set forth, a liquid crystal display device in accordance with the present invention includes a pair of substrates, a liquid crystal layer contained between the pair of substrates, and a plurality of pixel and common electrodes formed on the pair of substrates, respectively. In which, each pixel electrode and common electrode defining at least a first portion and a second portion, respectively. The first portions of the pixel and common electrodes are alternately arranged parallel to a first direction, and the second portions of the pixel and common electrodes are arranged parallel to a second direction essential perpendicular to the first direction.

Other objects, advantages, and novel features of the present invention will become more apparent from the following detailed description when taken in conjunction with the accompanying drawings.

DETAILED DESCRIPTION OF THE PRESENT INVENTION

Figure 1:
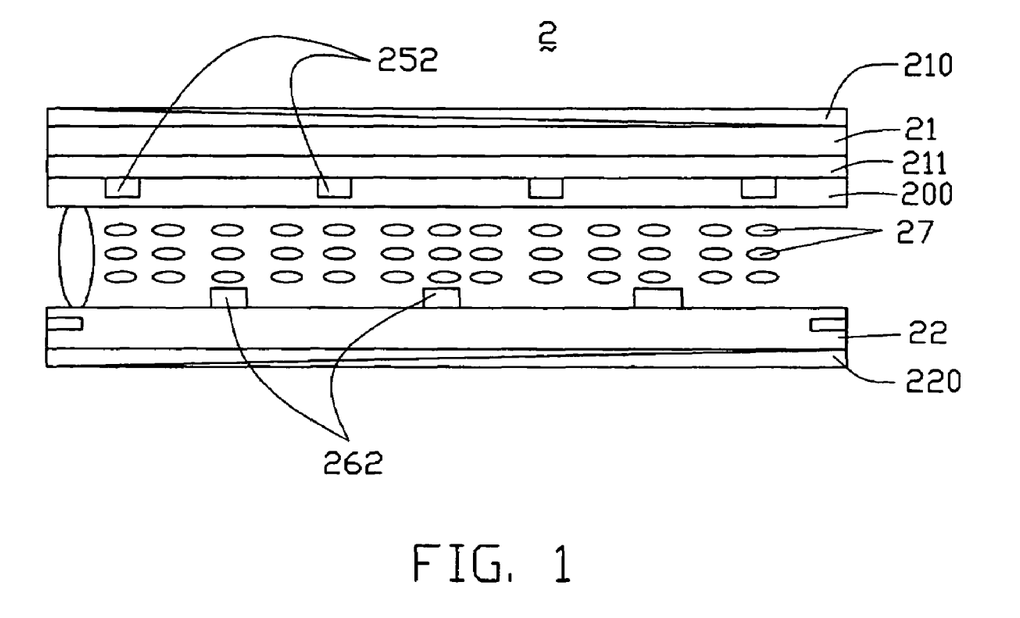
FIG. 1 is a schematic, side cross-sectional view of part of an LCD device according to a first embodiment of the present invention, showing the LCD device in a passive state.

Referring to FIG. 1, an LCD device 2 of the first embodiment of the present invention includes a first transparent substrate 21, a second transparent substrate 22, and a liquid crystal layer 27 sandwiched between the first and second substrates 21 and 22. A color filter 211 is provided on a surface of the first transparent substrate 21 opposite to the second transparent substrate 22, and a multiplicity of TFTs 29 (see FIG. 2) is provided on the second transparent substrate 22 facing toward the liquid crystal layer 27.

The first substrate 21 has an alignment film 200 coated on the color filter 211, such that the liquid crystal 27 is sandwiched between the alignment film 200 and the second substrate 22. Liquid crystal molecules in the liquid crystal layer 27 are substantially uniformly aligned in a direction according to the alignment film 200.

The first substrate 21 has a polarizing plate 210 adhered to an outer surface thereof, and the second substrate 22 has a polarizing plate 220 adhered to an outer surface thereof. The polarizing plates 210 and 220 respectively have polarizing axes perpendicular to each other, with one of the polarizing axes being set parallel to the direction in which the liquid crystal molecules are aligned.

Figure 2:
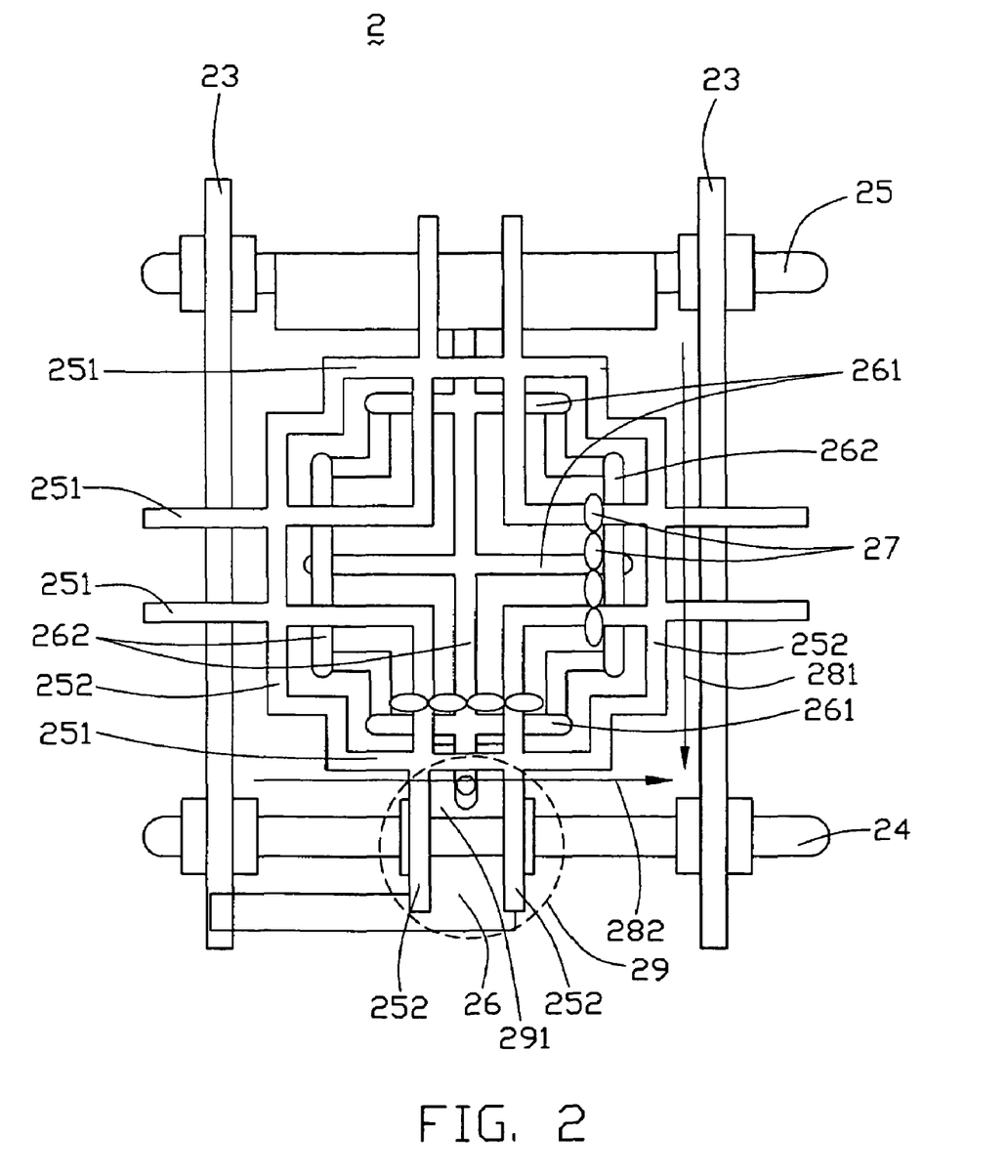
FIG. 2 is a top plan view of a configuration of electrodes of the LCD device of FIG. 1.

Also referring to FIG. 2, a gate line 24 and two data lines 23 define a pixel area. The data lines 23 are parallel to but spaced apart from each other, and are substantially perpendicular to the gate line 24. A TFT 29 is arranged near the gate line 24 and between two data lines 23.

Pixel electrodes 26 and common electrodes 25 are formed in the pixel area. The pixel and common electrodes 26, 25 are made of a transparent conductive material such as indium-tin-oxide (ITO) or indium-zinc-oxide (IZO). The pixel electrodes 26 are formed directly on the second substrate 22, and include a multiplicity of first portions 261 and a multiplicity of second portions 262 substantially perpendicular to the first portions 261. Each pixel electrode 26 is electrically connected to a drain electrode 291 of the TFT 29. Each common electrode 25 has a common line 253, a multiplicity of first portions 251, and a multiplicity of second portions 252. The common line 253 is disposed on the second substrate 22, and is parallel to the gate line 24. The first and second portions 251, 252 are formed on the first substrate 21, and are electrically connected to the common line 253 through a contact hole (not shown).

The first portions 251, 261 are alternately disposed parallel to each other, and are all oriented in a first direction. The second portions 252, 262 are alternately disposed parallel to each other, and are all oriented in a second direction substantially perpendicular to the first direction.

Figure 3:
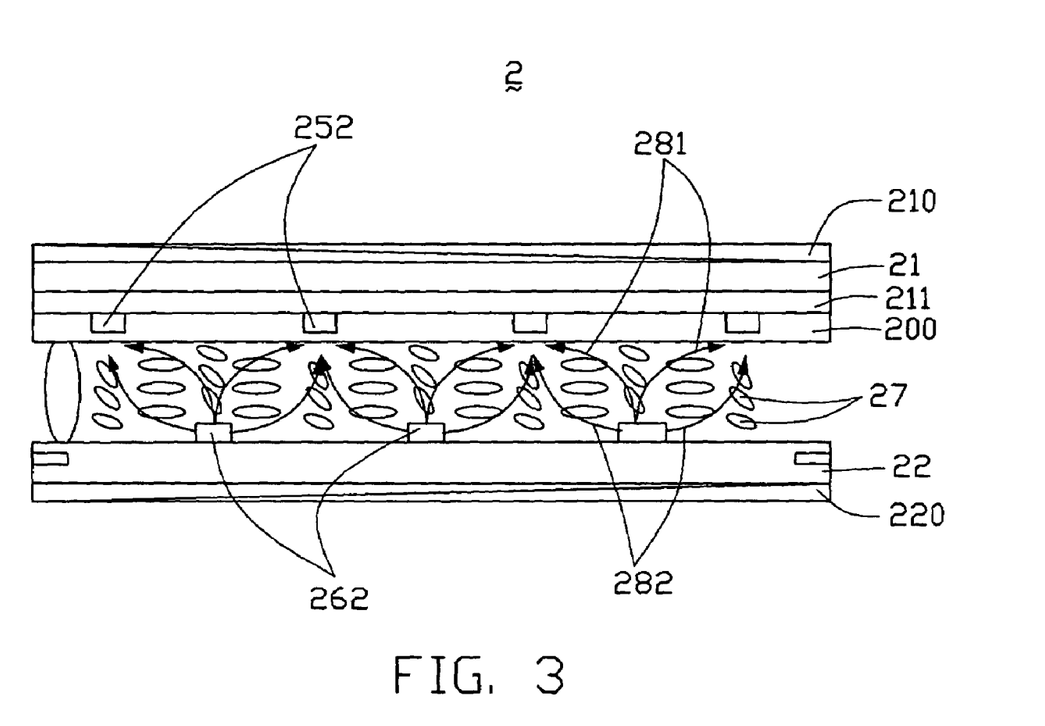
FIG. 3 is similar to FIG. 1, but showing the LCD device when a voltage is applied thereto.

Referring to FIG 3, a common voltage is applied to all the common electrodes 25 through the common lines 253, and a voltage is applied to the pixel electrodes 26 through the TFT 29. An electric field in two substantially perpendicular directions 281 and 282 is thereby established between the pixel electrodes 26 and the common electrodes 25. The electric field causes liquid crystal molecules in the liquid crystal layer 27 to be twisted, for controlling an associated display of the LCD device 2.

According to the configuration of the first and second portions 251, 261, 252, 262 of the common and pixel electrodes 25, 26, electric fields are generated in directions 281 and 282 that are different from each other so as to form two regions in the space defined between the first and second portions 251, 261, 252, 262. Accordingly, the liquid crystal molecules in the liquid crystal layer 27 are twisted in the two different directions 281 and 282.

As a result, different colors can be seen in the two regions in a corresponding display screen, when the display screen is obliquely viewed while displaying white. Since the colors compensate for each other, the color shift can be reduced.

Figure 4:
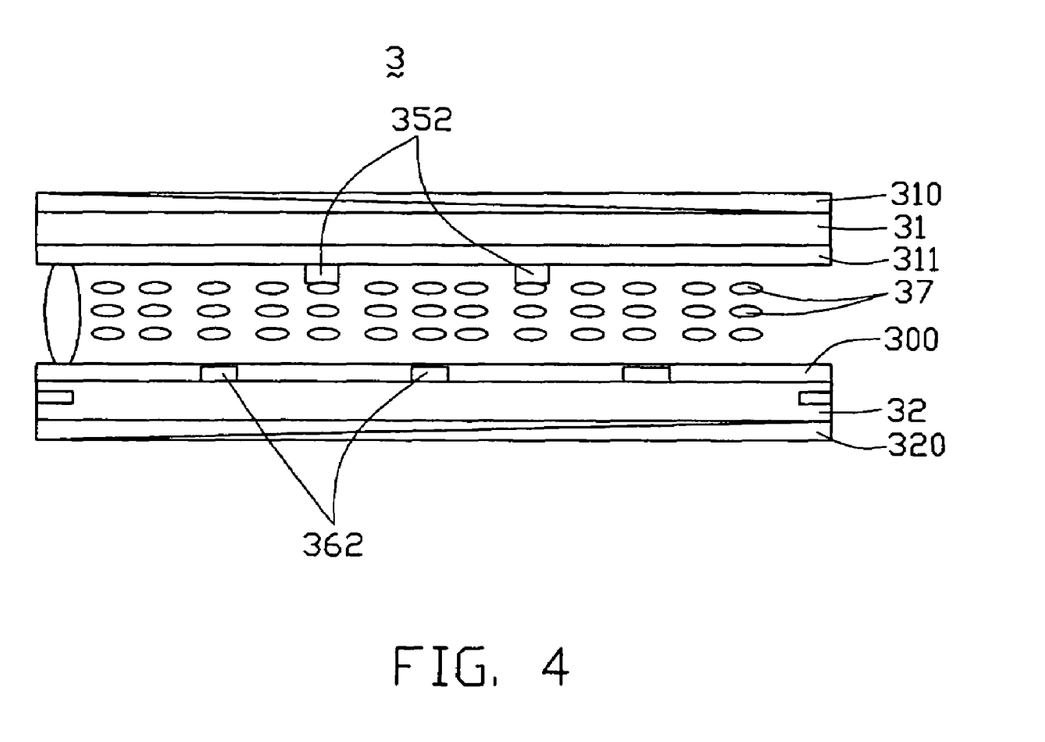
FIG. 4 is a schematic, side cross-sectional view of part of an LCD device according to a second embodiment of the present invention, showing the LCD device in a passive state.

Referring to FIG. 4, a side view according to a second embodiment of an LCD device 3 of the present invention is shown. The LCD device 3 has a configuration similar to the LCD device 2 of the first embodiment. Upper and lower substrates 31 and 32 are spaced apart from each other, and a liquid crystal display layer 37 is interposed therebetween.

The upper substrate 31 has a color filter 311 on a surface nearest to the lower substrate 32. The lower substrate 32 has an alignment film 300 coated on a surface thereof nearest to the upper substrate 31, such that the liquid crystal 37 is sandwiched between the color filter 311 and the alignment film 300. Liquid crystal molecules in the liquid crystal layer 37 are substantially uniformly aligned in a direction according to the alignment film 300.

The upper and lower substrates 31 and 32 have polarizing plates 310 and 320 adhered to outer surfaces thereof, respectively. The polarizing plates 310 and 320 respectively have polarizing axes perpendicular to each other, with one of the polarizing axes being set parallel to the direction in which the liquid crystal molecules are aligned.

Figure 5:
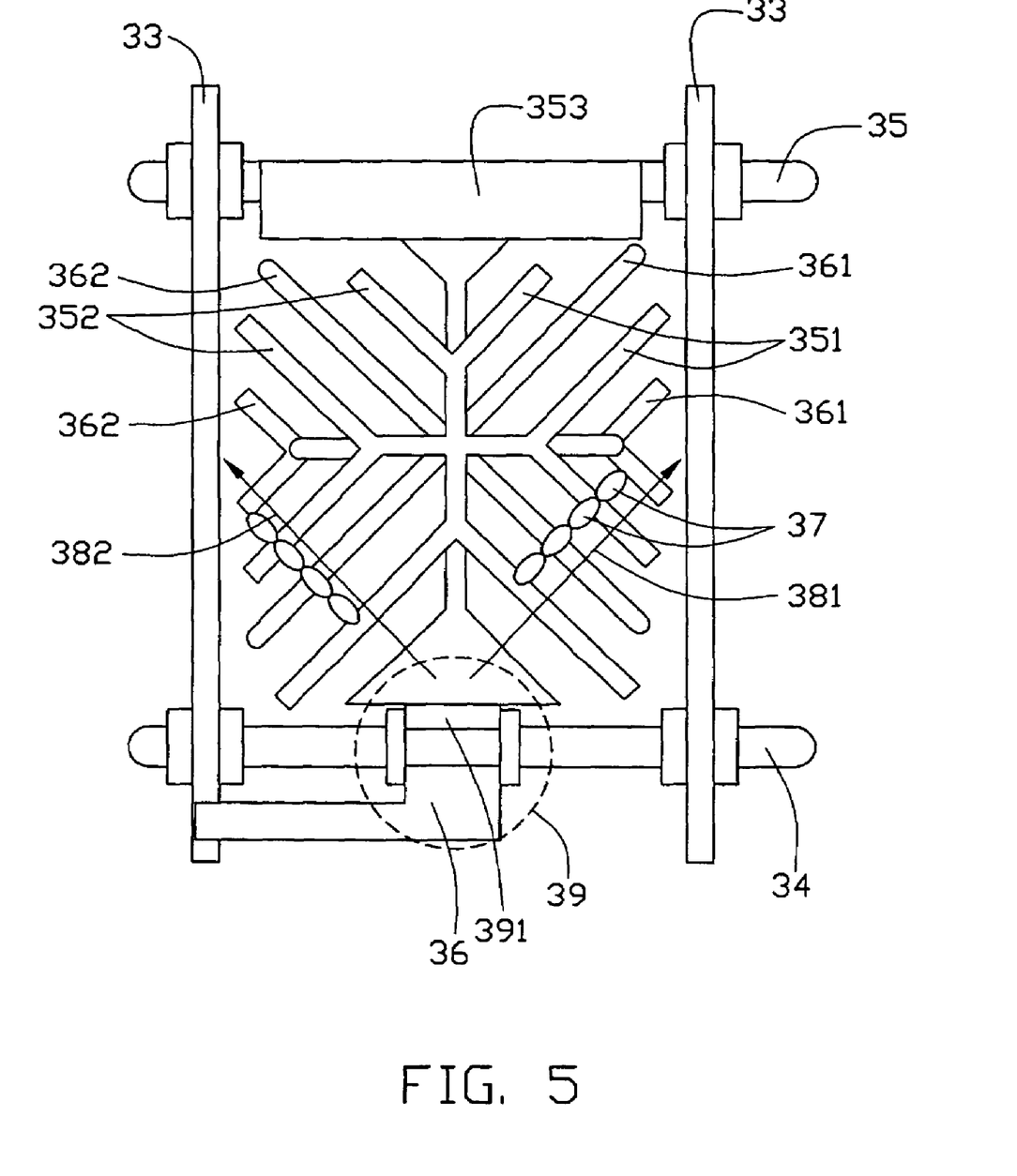
FIG. 5 is a top plan view of a configuration of electrodes of the LCD device of FIG. 4.

Referring also to FIG. 5, a plurality of pixel areas is defined on the lower substrate 32. Each pixel area comprises a gate line 34 and two data lines 33. The data lines 33 are parallel to but spaced apart from each other, and are substantially perpendicular to the gate line 24. A TFT 39 is arranged at intersections of the gate line 34 and the data line 33, so as to define a pixel area therebetween.

Pixel electrodes 36 and common electrodes 35 are formed in the pixel area. The pixel and common electrodes 36, 35 are made of a transparent conductive material such as indium-tin-oxide (ITO) or indium-zinc-oxide (IZO). The pixel electrodes 36 are formed directly on the lower substrate 32, and include a multiplicity of first portions 361 and a multiplicity of second portions 362 substantially perpendicular to the first portions 361. The first portions 361 are disposed at an oblique angle relative to the data lines 33. In the illustrated embodiment, the angle is 45 degrees. Each pixel electrode 36 is electrically connected to a drain electrode 391 of the TFT 39. Each common electrode 35 has a common line 353, a multiplicity of first portions 351, and a multiplicity of second portions 252. The common line 353 is disposed on the lower substrate 32, and is parallel to the gate line 34. The first and second portions 351, 352 are formed on the upper substrate 31, and are electrically connected to the common line 353 through a contact hole (not shown).

The first portions 351, 361 are alternately disposed parallel to each other, and are all oriented in a first direction. The second portions 352, 362 are alternately disposed parallel to each other, and are all oriented in a second direction substantially perpendicular to the first direction.

Figure 6:
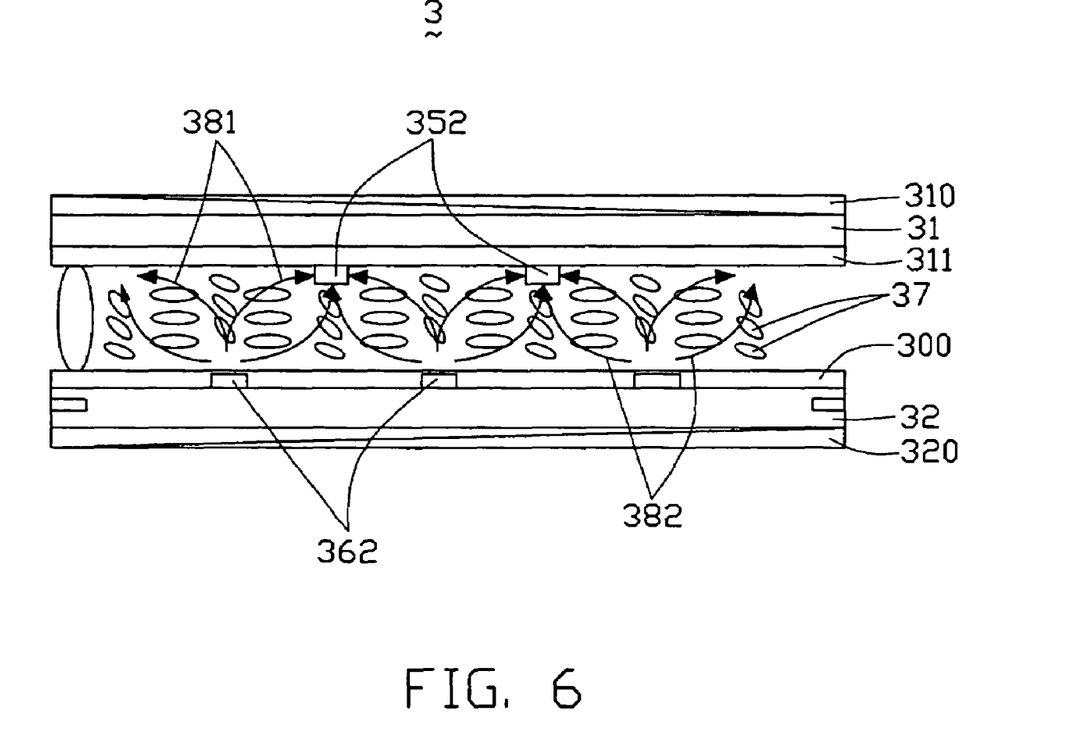
FIG. 6 is similar to FIG. 4, but showing the LCD device when a voltage is applied thereto.

Referring to FIG 6, a common voltage is applied to all the common electrodes 35 through the common lines 353, and a voltage is applied to the pixel electrodes 36 through the TFT 39. An electric field in two substantially perpendicular directions 381 and 382 is thereby established between the pixel electrodes 36 and the common electrodes 35. The electric field causes the liquid crystal molecules in the liquid crystal layer 37 to be twisted, for controlling an associated display of the LCD device 3.

This configuration results in electric fields generating in different directions 381 and 382 in the space defined between the first and second potions 351, 361, 352, 362 so as to form two domains. Accordingly, the liquid crystal molecules in the liquid crystal layer 37 are twisted in the two different directions 381 and 382.

Compared with the conventional single-domain IPS-LCD device, the liquid crystal molecules in the LCD device 2, 3 are twisted in two different directions. As a result, different colors can be seen in the two regions in a corresponding display screen, when the display screen is obliquely viewed while displaying white. Since the colors compensate for each other, the color shift can be reduced. Furthermore, the pixel and common electrodes 26, 36, 25, 35 are made of a transparent conductive material, so that the aperture ratio can be improved.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A liquid crystal display device, comprising:
   a pair of substrates oppositely facing each other in a vertical direction;
   a liquid crystal layer contained between the pair of substrates; and
   a plurality of gate lines and a plurality of data lines crossing the gate lines, the gate lines and data lines disposed at one of said substrates;
   a set of pixel electrodes and a set of common electrodes respectively located at different levels between said pair of substrates in said vertical direction, the two sets of pixel and common electrodes separated by the liquid crystal layer;
   wherein, each set of pixel and common electrodes extends along at least two different horizontal directions to define at least a first portion and at least a second portion, respectively, the first potions of the pixel and common electrodes are alternately arranged parallel to each other and are each aligned along a first direction, and the second portions of the pixel and common electrodes are alternately arranged parallel to each other and are each aligned along a second direction perpendicular to the first direction;
   wherein an electric field in two perpendicular directions is established between the pixel electrodes and the common electrodes when a voltage is applied thereto; and
   the first portions are disposed at an oblique angle relative to the data lines.

* * * * *